July 17, 1956 W. C. LUEBKING 2,754,697
PLANETARY SHAFT POSITIONING SYSTEM
Filed July 6, 1953 3 Sheets-Sheet 2

INVENTOR.
WALTER C. LUEBKING
BY
ATTORNEY

July 17, 1956  W. C. LUEBKING  2,754,697
PLANETARY SHAFT POSITIONING SYSTEM
Filed July 6, 1953  3 Sheets-Sheet 3

INVENTOR.
WALTER C. LUEBKING
BY
ATTORNEY

United States Patent Office 2,754,697
Patented July 17, 1956

2,754,697

PLANETARY SHAFT POSITIONING SYSTEM

Walter C. Luebking, Cedar Rapids, Iowa, assignor to Collins Radio Company, Cedar Rapids, Iowa, a corporation of Iowa Application July 6, 1953, Serial No. 366,085

1 Claim. (Cl. 74—781)

This invention relates generally to shaft positioning apparatus and in particular to a planetary gear type of shaft positioning apparatus which does not require a slip clutch for its operation.

Shaft positioning apparatus is often used in the radio industry to obtain automatic tuning. Such apparatus ordinarily consists of a mechanical arrangement of shafts, cam rings, pawls and clutches and is usually controlled by a seeking switch that is electrically connected to a selector switch which may be remotely located. Each position of the selector switch corresponds to a predetermined tuning shaft position.

Shaft positioning mechanisms generally have a single motor which is geared to a plurality of shaft controlling sub-assemblies. The various sub-assemblies are rotated by the motor in a predetermined sequence under the control of a pawl system. Generally in such systems some of the shafts reach their correct positions before the others and if a single motor is used for all units, slip clutches must be provided to allow the motor to continue after some of the shafts are locked.

Even when only one shaft positioning mechanism is being driven, there should be a slip clutch between the motor and shaft because when the shaft is suddenly stopped the inertia of the motor armature should be dissipated by the clutch.

It is therefore an object of this invention to provide a planetary or epicyclic gear system for shaft positioning apparatus which eliminates slip clutches.

For a description of shaft positioning mechanisms, reference may be made to Patent Number 2,476,673 to May and Schweighofer owned by the assignee of this invention. While such prior apparatus has generally been reliable, experience has shown that the slip clutch has often been the first part to give difficulty.

It is a further object of this invention to provide a clutchless shaft positioning apparatus which allows any number of shafts to be selectively driven by one motor to any predetermined position.

Another object of this invention is to provide an apparatus which will position shafts without a clutch.

A feature of this invention is found in the provision for a controlled shaft which has a seeking switch and a toothed-stop wheel mounted thereon. A bifurcated pawl is pivotally supported so as to engage the stop wheel to lock it. The pawl is also engageable with a drive control wheel that is rotatably mounted on the controlled shaft and which has a sun gear connected thereto. A yoke is non-rotatably mounted on the shaft and supports a pair of planet gears that mesh with the sun gear. A ring gear is connected to a motor and meshes with the planet gears.

Further advantages, objects and features of this invention will be apparent to those skilled in the art upon a further study of the specification and drawings, in which.

Figure 1:
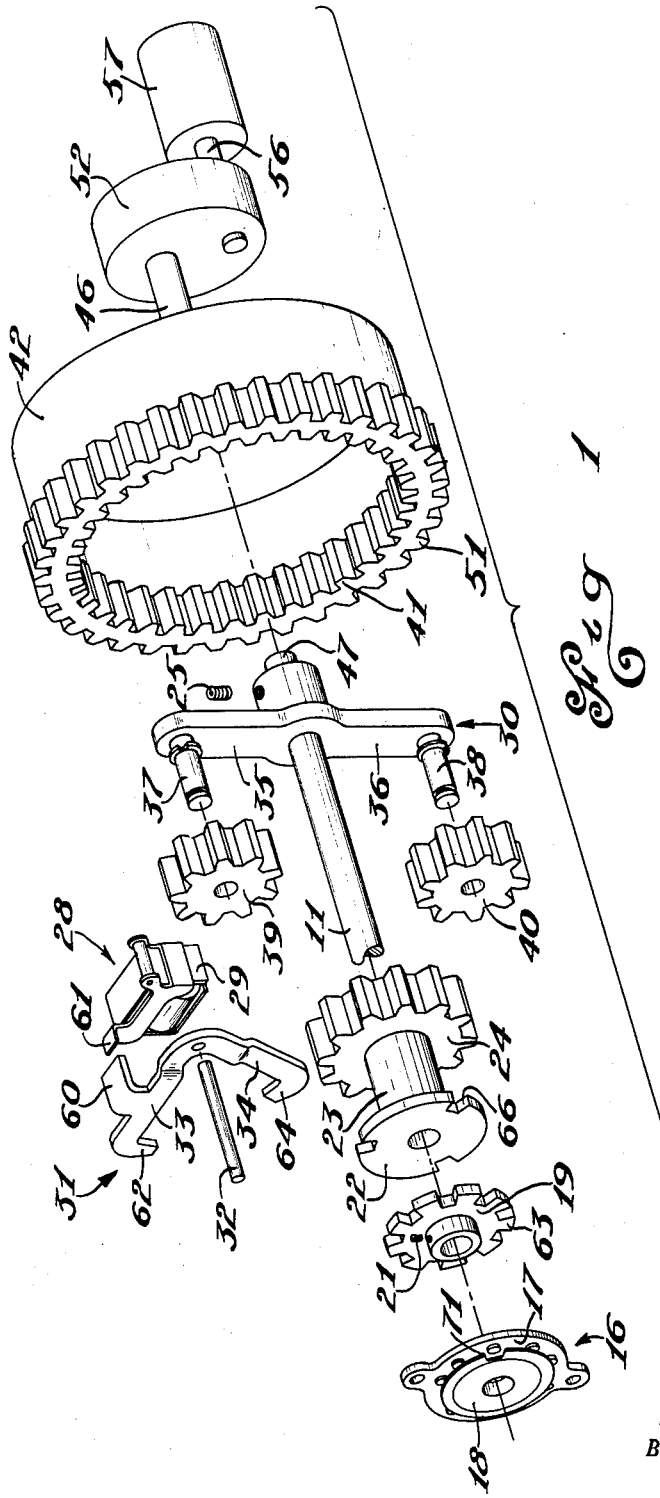
Figure 1 is an exploded view of this invention.
Figure 2:
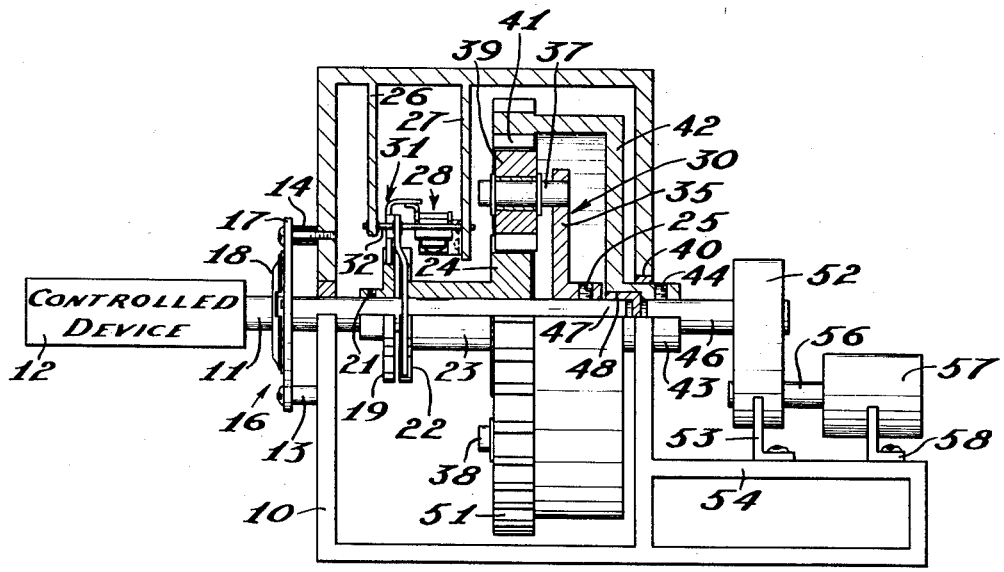
Figure 2 is a half-section of the invention.

Referring to Figures 1 and 2, it is seen that a bracket 10 rotatably supports a controlled shaft 11 which has one end thereof connected to a control device 12 which might, for example, be a tuned circuit that is tuned in response to rotation of shaft 11.

A pair of stand-offs 13 and 14 are connected to frame 10 and support a seeking switch designated generally as 16 and which has a stator 17 attached to the stand-offs 13 and 14 and a rotor 18 connected to the shaft 11 to rotate therewith.

A stop wheel 19 is formed with a plurality of teeth and is non-rotatably attached to the controlled shaft 11 by a set screw 21. A drive control wheel 22 is rotatably supported on the shaft 11 and is connected to a sleeve 23 which has its opposite end attached to a sun gear 24.

Supporting arms 26 and 27 support a relay 28 which has an armature 29 that controls a bifurcated pawl 31 which is rotatably supported by shaft 32 that is mounted to the arms 26 and 27. The bifurcated pawl 31 has a pair of legs 33 and 34 that are angularly and laterally offset so that one of them is engageable with the stop wheel 19 and the other one is engageable with the drive control wheel 22.

A bracket 30 is non-rotatably attached to the shaft 11 by a set screw 25 and has a pair of arms 35 and 36 which support transverse pins 37 and 38 upon which are mounted, respectively, planet gears 39 and 40 which are in mesh with the teeth of the sun gear 24. An internal ring gear 41 is in mesh with the planet gears 39 and 40 and is supported by a cylindrical member 42 which has a coupling portion 43 that is attached by a set screw 44 to a drive shaft 46.

It is to be noted that the end 47 of shaft 11 is rotatably supported by the member 43 with a suitable bearing 48 and that the shafts 46 and 11 are not connected together.

The outer portion of the member 43 is supported by the frame 10 with suitable bearings 49. An outer ring gear 51 is mounted adjacent the inner ring gear 41 on the cylindrical member 42 and may be used for a purpose to be later described.

The shaft 46 is rotatably supported by a gear reduction 52 which is mounted by supports 53 on an extension 54 of the frame member 10. Gear reduction 52 has an input shaft 56 which is connected to a suitable drive motor 57 which is also mounted by supports 58 on the extension 54.

Figure 4:
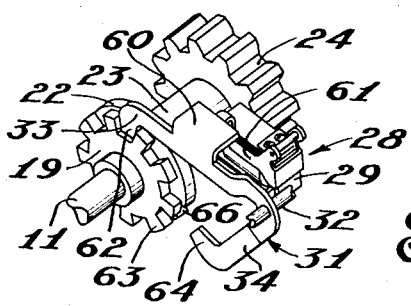
Figure 4 is a perspective detail view of the double pawl structure.

Figure 4 illustrates in detail the sun gear 24, the sleeve 23, the drive control wheel 22, the control shaft 11, the stop wheel 19, the relay 28 and the pawl 31.

It is to be noted that the armature 29 of the relay has an extension 61 which is engageable with a lever 60 connected to the leg 33 of pawl 31. It is to be noted that the leg 33 has a tooth-engaging portion 62 which engages the teeth 63 of stop wheel 19 and the leg 34 of the pawl has a tooth-engaging portion 64 which is engageable with the teeth 66 of the drive control wheel 22.

Figure 3:
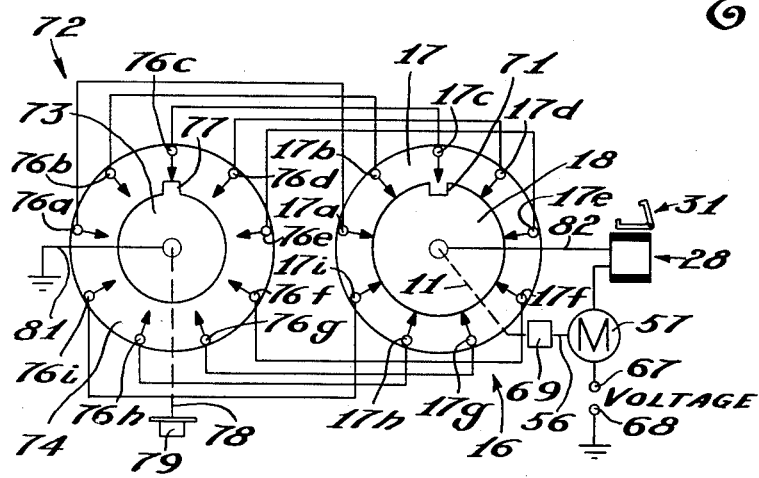
Figure 3 shows the control circuit for the invention shown in Figures 1 and 2.

A suitable electricial circuit is illustrated in Figure 3. A suitable voltage source is connected to the motor between the motor and ground at the terminals 67 and 68. The output shaft 56 of the motor is coupled by the gearing 69 which consists of the gears previously described to the control shaft 11 so as to drive the rotor 18 of the seeking switch 16.

The stator 17 of the seeking switch comprises a plurality of contacts 17a through 17i which are engageable at all times with the rotor 18 except when the notch 71 of the rotor is in alignment therewith.

A remote control switch 72 has a rotor 73 and a stator 74. The stator 74 has a plurality of contacts 76a through 76i which are connected, respectively, to the contacts 17a through 17i on the stator 17 of the seeking switch.

The rotor 73 has a projection 77 which may be moved to engage one of the contacts 76a through 76i. The rotor 73 is controlled by the shaft 78 which has a manual control knob 79 connected thereto. The rotor 73 is grounded by lead 81.

The rotor 18 of the seeking switch 16 is electrically connected by the lead 82 to one side of the relay 28 and the other side of the relay is connected in series with the motor 57 to the voltage supply applied between terminals 67 and 68.

In operation the shaft 11 will be driven by the mechanism of this invention in response to the rotation of the control knob 79. The electrical control circuit illustrated shows nine contacts on the stator 74 which correspond to nine different positions of the shaft 11 and the stop wheel 19 would therefore have nine positions, each corresponding to a different position of the shaft 11. It is to be realized that numerous control and seeking switches are known and, for example, the wiring scheme and switches illustrated in Patent Number 2,476,673 might be used in lieu of the switches shown. The switches shown, however, make it possible to easily follow the electrical circuits.

It it be assumed that the projection 77 of the rotor 73 is in the position corresponding to the notch 71 of the rotor 18, the motor drive circuit and relay 28 will be open so that the relay 28 is unenergized and the motor is stationary. When this occurs the pawl 31 will be positioned such that the leg 33 will cause the tooth-engaging portion 62 to engage the teeth 63 of the stop wheel 19 and the shaft 11 and the control device 12 will be locked in a particular position. The armature 29 may be spring biased in a conventional manner to the open position to force the portion 62 to engage the teeth 63.

When the knob 79 is moved from engagement with contact 76c to engage another contact, for example, 76e, then there will be a closed circuit through the motor 57, the relay 28, the seeking switch 16 and the controlling switch 72. This causes the relay 28 to be energized, thus moving the bifurcated pawl 31 so that the arm 34 causes the engaging portion 64 to engage the teeth 66 of the drive control wheel 22, and simultaneously the portion 62 is removed from engagement with the teeth 63 of the stop wheel 19 and the shaft 11 will be free to rotate.

The cylindrical member 42 will be driven by the shaft 46 and will cause the inner ring gear 41 to rotate the planet gears 39 and 40. The sun gear 24 will be held stationary by the sleeve 23 and the drive control wheel 22, due to engagement of the pawl 31 therewith and thus the bracket 30 will be rotated as the planet gears 39 and 40 move about the sun gear 24. Since the bracket 30 is fixed to the shaft 11 it will drive it, thus causing the toothed stop wheel 19, the rotor 18 of the seeking switch and the control device to be rotated.

When the rotor 18 of the seeking switch 16 is positioned such that the notch 71 is in alignment with the contact 17e, the circuit through the motor and relay will be open and the relay will be de-energized, thus allowing the pawl 31 to move the engaging portion 64 out of engagement with the teeth 66 of the drive control wheel 22 and the engaging portion 62 of the pawl will lock the stop wheel 19 by engaging the teeth 63. This locks the controlled shaft 11 in the new correct position.

Due to the inertia of the motor armature, the cylindrical member 42 will not immediately stop and the kinetic energy of the armature may be dissipated by rotating the inner ring gear 41, the planet gears 39 and 40, and the sun gear 24, sleeve 23 and drive control wheel 22. Sun gear 24 will be free to rotate because the drive control wheel is no longer held by the pawl 31.

Thus, the bracket 33 will no longer rotate but rotation of the sun gear 24 will occur until the armature of the motor has coasted to a stop. This provision prevents instantaneous stopping of the armature of the motor which causes undue wear on the teeth 63 of the stop wheel 19.

Figure 5:
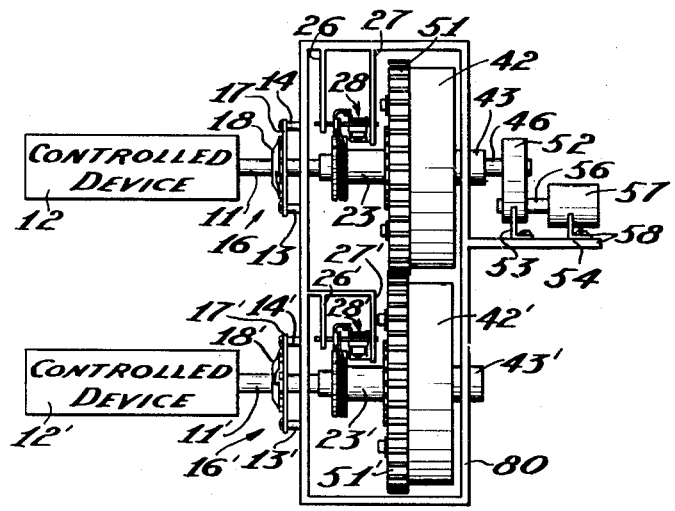
Figure 5 illustrates a pair of shaft positioners coupled together.
Figure 6:
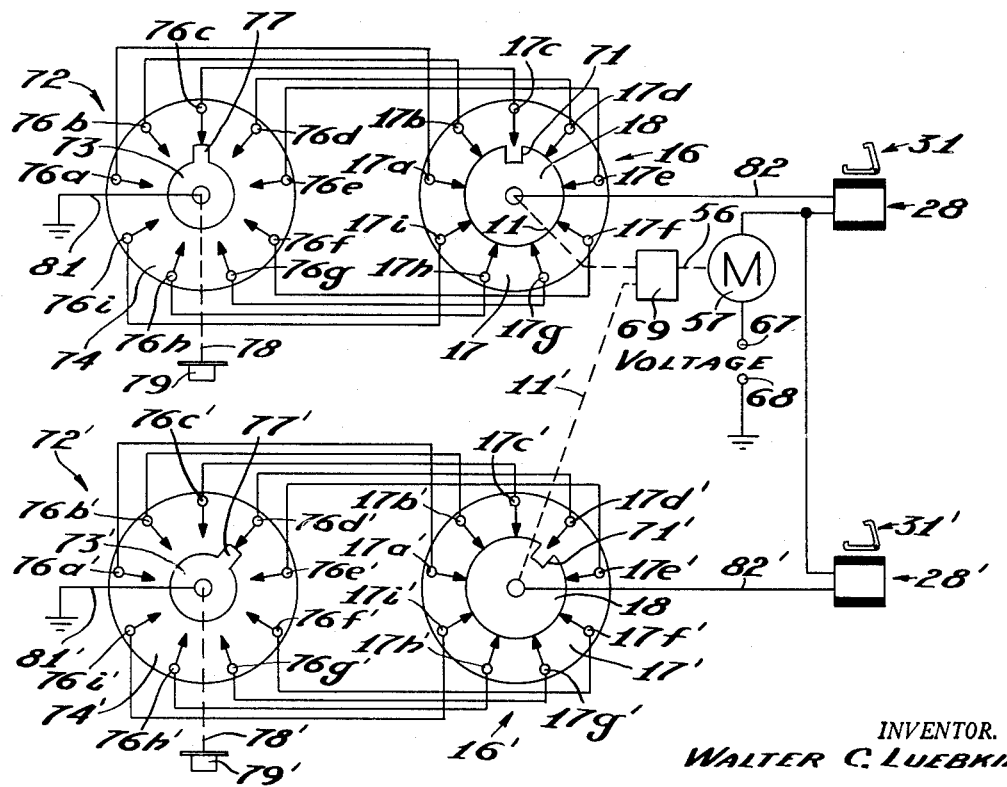
Figure 6 illustrates a control circuit for a pair of shaft positioning devices.

A modification of the invention is illustrated in Figures 5 and 6 wherein a pair of shaft positioning mechanisms similar to that illustrated in Figure 2 are mounted in a suitable frame member 80 and the single motor 57 drives both structures. The outer ring gear 51 engages the outer ring gear 51' of the second unit so as to drive it. The seeking switch and other elements of the second unit are the same as the first unit and are designated by adding a prime to the numbers.

It is to be noted that two control switches are used and are connected, respectively, to the seeking switches of the particular units so that the single motor 57 may simultaneously drive both units. The relays 28 and 28' and the control circuits are connected in parallel so that the motor will run until both circuits are open. The operation of each individual unit will be the same as previously described with the pawls 31 and 31', respectively, locking and unlocking the control shafts 11 and 11' in response to their particular seeking and controlled switches.

It is to be realized, of course, that any number of units may be driven by a single motor merely by meshing their outer ring gears such as shown in Figure 5. Separate control circuits may be added for each unit.

It is seen that this invention provides a new and novel shaft positioning mechanism wherein the conventional clutch is eliminated and wherein a plurality of shaft positioning mechanisms may be driven by a single motor.

Although it has been described with respect to particular embodiments thereof, it is not to be so limited as changes and modifications may be made therein which are within the full intended scope of the invention, as defined by the appended claim.

I claim:

A plurality of shaft positioning mechanisms comprising, a first controlled shaft rotatably supported by a frame member, a first toothed-stop-wheel nonrotatably supported by the first controlled shaft, a first toothed-drive-control-wheel rotatably supported by the first controlled shaft, a first bifurcated pawl pivotally supported by the frame member and formed with a first pair of legs which have teeth-engaging portions at each end, said first pair of legs laterally offset from each other so as to respectively engage the first toothed-stop-wheel and the first drive-control-wheel, a first relay mounted on said frame member and connected to said first bifurcated pawl to control its position, a first sun gear connected to said first drive-control-wheel and rotatably supported on the first controlled shaft, a first bracket nonrotatably attached to the first controlled shaft and formed with a first pair of arms, a first pair of transverse pins mounted adjacent the ends of said arms, a first pair of planet gears rotatably supported on the first transverse pins and engageable with the first sun gear, a drive shaft rotatably supported by the frame member, a first cylindrical member nonrotatably attached to said drive shaft, a first internal ring gear mounted within said first cylindrical member and engageable with the first planet gears, a drive means connected to said drive shaft, a first external ring gear connected to said first cylindrical member, a second controlled shaft rotatably supported by the frame member, a second toothed-stop-wheel nonrotatably supported by the second controlled shaft, a second toothed-drive-control-wheel rotatably supported by the second controlled shaft, a second bifurcated pawl pivotally supported by the frame member and formed with a second pair of legs, said second pair of legs laterally offset from each other so as to respectively engage the second toothed-stop-wheel and the second drive-control-wheel, a second sun gear connected to the second drive-control-wheel and rotatably supported on the second controlled shaft, a second bracket nonrotatably attached to the second controlled shaft and formed with a second pair of arms, a second pair of pins mounted on said arms, a second pair of planet gears rotatably mounted on the second pair of pins and engageable with the second sun gear, a second cylindrical member rotatably supported by the second controlled shaft, a second internal ring gear mounted within said second cylindrical member and engageable with the second planet gears, a second external ring gear connected to said second cylindrical member and engageable with the first external ring gear, and a second relay mounted on the frame member and connected to said second bifurcated pawl to control its position.

References Cited in the file of this patent

UNITED STATES PATENTS

| Re. 22,574 | Collins | Dec. 5, 1944 |
| 2,085,442 | Newell | June 29, 1937 |
| 2,088,110 | Lamb | July 27, 1937 |
| 2,406,184 | Alspaugh | Aug. 20, 1946 |
| 2,436,172 | Kent | Feb. 17, 1948 |

OTHER REFERENCES

New Time Totalizer, Product Engineering, vol. 24, Issue 2, page 277, Feb. 1953.